(12) United States Patent
Watanabe

(10) Patent No.: US 11,215,969 B2
(45) Date of Patent: Jan. 4, 2022

(54) NUMERICAL CONTROL DEVICE AND MACHINE TOOL

(71) Applicant: FANUC CORPORATION, Yamanashi (JP)

(72) Inventor: Toshihiro Watanabe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 17 days.

(21) Appl. No.: 16/859,509

(22) Filed: Apr. 27, 2020

(65) Prior Publication Data

US 2020/0379433 A1   Dec. 3, 2020

(30) Foreign Application Priority Data

May 30, 2019   (JP) .............................. JP2019-101561

(51) Int. Cl.
 *G05B 19/18* (2006.01)
 *G05B 19/4065* (2006.01)
 *G05B 19/414* (2006.01)

(52) U.S. Cl.
 CPC ....... *G05B 19/4065* (2013.01); *G05B 19/182* (2013.01); *G05B 19/414* (2013.01)

(58) Field of Classification Search
 CPC .............. G05B 19/4065; G05B 19/414; G05B 19/182; G05B 2219/37242; G05B 2219/37434; G05B 2219/50007; B23Q 15/013

See application file for complete search history.

(56) References Cited

U.S. PATENT DOCUMENTS

2020/0257261 A1* 8/2020 Koshiishi ............... G06N 20/00

FOREIGN PATENT DOCUMENTS

| JP | H01-150909 A | 6/1989 |
| JP | 2011-248473 A | 12/2011 |

* cited by examiner

*Primary Examiner* — Christopher E. Everett
(74) *Attorney, Agent, or Firm* — Studebaker & Brackett PC

(57) ABSTRACT

A numerical control device according to an aspect of the present disclosure controls, in accordance with a machining program, a machine tool that includes a plurality of machining systems performing machining by each causing a tool to act on a workpiece, and can perform tool oscillation that causes a relative speed of the tool in relation to the workpiece to periodically change in at least one of the machining systems, the numerical control device including: a condition change unit which, upon newly starting machining by one of the machining systems, in a case of another of the machining systems performing machining for which a presence/absence of the tool oscillation differs from the newly starting machining, changes a condition of the newly starting machining or the machining for which the presence/absence of the tool oscillation differs, from a condition derived from the machining program.

6 Claims, 4 Drawing Sheets

NUMERICAL CONTROL DEVICE AND MACHINE TOOL

This application is based on and claims the benefit of priority from Japanese Patent Application No. 2019-101561, filed on 30 May 2019, the content of which is incorporated herein by reference.

BACKGROUND OF THE INVENTION

Field of the Invention

The present invention relates to a numerical control device and a machine tool.

Related Art

Machine tools such as lathes, for example, have been used that have a spindle causing a tool to rotate relative to a workpiece which is a machining target, and a feed axis which causes the tool to relatively move in a parallel direction to the rotation axis of the spindle relative to the workpiece, and causes the spindle and feed axis to cooperatively operate to cut the workpiece by way of the tool. For such a machine tool, the spindle and feed axis, as well as other drive axes, are normally controlled by a numerical control device.

With a machine tool such as a lathe, since the cutting edge of the tool normally removes the material on the surface of the workpiece continuously, the material removed becomes long and thin chips (shaving dust) depending on the material of the workpiece, and there is a possibility of coiling around the tool and inhibiting the machining of the workpiece. In contrast, as described in Patent Document 1, for example, oscillation cutting of performing tool oscillation so as to cause the tool to reciprocally move relative to the workpiece at a predetermined vibration rotation number using a numerical control device has been known. With oscillation cutting, since the tool is periodically distanced from the workpiece by oscillating the tool, chips are cut to a certain length.

In addition, a machine tool which can improve machining efficiency by causing a plurality of tools to act simultaneously on one workpiece, a machine tool which can perform a plurality of machining simultaneously by causing each tool to act on a plurality of workpieces, respectively, i.e. a machine tool including a plurality of machining systems that cause tools to act on a workpiece have been realized, as described in Patent Document 2, for example.

Patent Document 1: Japanese Unexamined Patent Application, Publication No. 2011-248473

Patent Document 2: Japanese Unexamined Patent Application, Publication No. H1-150909

SUMMARY OF THE INVENTION

Patent Document 2 proposes creating a program using a relative command having a queue command of detecting operation in a designated system and then causing a set operation in the program to start; and a command of designating a system in which a mobile axis allowing relative movement is included, and further compensating this relative movement amount. Although it is possible to prevent the machining operation of one system from interfering with the machining operation of another system, the method of creating such a program requires high proficiency of the operators.

In particular, with a machine tool having a plurality of machining systems which can perform oscillation cutting, there is a possibility of the vibrations caused by oscillation of one machining system causing the machining precision of the other machining system to decline. In the case of machining precision being demanded, although non-oscillation cutting that does not cause the tool to oscillate is performed, when oscillation cutting is performed in a nearby machining system, there is concern over the machining precision of a machining system performing non-oscillation cutting becoming insufficient due to vibrations caused by tool oscillation. Therefore, a numerical control device and a machine tool have been desired which can easily prevent tool oscillation of either machining system from adversely influencing the machining of another machining system.

A numerical control device according to an aspect of the present disclosure controls, in accordance with a machining program, a machine tool that includes a plurality of machining systems performing machining by each causing a tool to act on a workpiece, and can perform tool oscillation that causes a relative speed of the tool in relation to the workpiece to periodically change in at least one of the machining systems, the numerical control device including: a condition change unit which, upon newly starting machining by one of the machining systems, in a case of another of the machining systems performing machining for which a presence/absence of the tool oscillation differs from the newly starting machining, changes a condition of the newly starting machining or the machining for which the presence/absence of the tool oscillation differs, from a condition derived from the machining program.

The numerical control device according to the present disclosure can easily prevent tool oscillation of any machining system from adversely influencing the machining of another machining system.

DETAILED DESCRIPTION OF THE INVENTION

Figure 1:
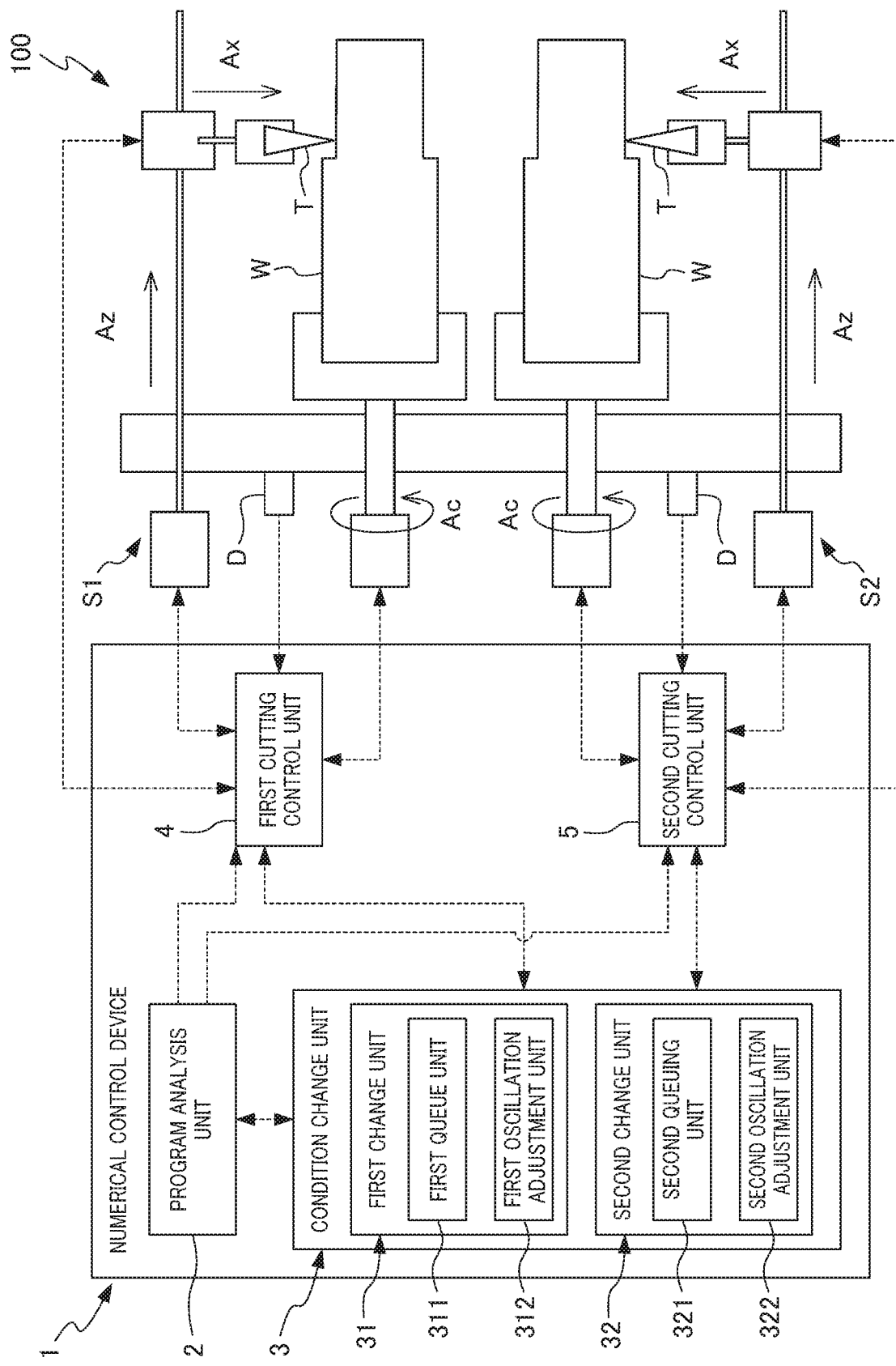
FIG. 1 is a schematic diagram showing the configuration of a machine tool according to an embodiment of the present disclosure.

Hereinafter, embodiments of the present disclosure will be explained while referencing the drawings. FIG. 1 is a schematic diagram showing the configuration of a machine tool 100 according to an embodiment of the present disclosure.

The machine tool 100 includes: a first machining system S1 and a second machining system S2 which perform cutting by causing a tool T to act on a workpiece W; and a numerical control device 1 which controls the first machining system S1 and second machining system S2. This machine tool 100 is a so-called parallel 2-spindle lathe that respectively cuts two workpieces W which are machining targets, using different tools T. With the machine tool 100, oscillation cutting which cuts chips by performing tool oscillation causing the relative speed of the tool T in relation to the workpiece W to periodically change, as well as non-oscillation cutting which keeps constant the relative speed of the tool T in relation to the workpiece W without tool oscillation, are possible in the first machining system S1 and second machining system S2.

It should be noted that, generally, in a case of cutting the workpiece W, in order to eliminate the risk of chips tangling and becoming trouble, it is effective to shorten the chips and cut by the oscillation cutting performing tool oscillation. However, when performing oscillation cutting, there is concern over the machining precision declining by the machine tool 100 vibrating due to tool oscillation. Therefore, it is assumed that oscillation cutting is selected in the case of machining error caused by vibration due to tool oscillation being permittable, and non-oscillation cutting is selected only in the case of machining precision so high that machining error caused by vibration from tool oscillation cannot be permitted is required.

The first machining system S1 and second machining system S2 respectively have the three control axes of a spindle Ac which causes the tool T to relatively rotate (rotating the workpiece W in the present embodiment) in relation to the workpiece W; a feed axis Az which causes the tool T to relatively move in relation to the workpiece W in a direction parallel to the rotation axis of the spindle Ac (moving the tool T in the present embodiment); and a cutting axis Ax which causes the tool T to relatively move in relation to the workpiece W in the radial direction of the spindle Ac (moving the tool T in the present embodiment). In the first machining system S1 and second machining system S2, the oscillation cutting is realized by tool oscillating the driving speed of the feed axis Az. In addition, the first machining system S1 and second machining system S2 may have a drive sensor D which detects the respective vibrations.

The numerical control device 1 controls the machine tool 100, i.e. first machining system S1 and second machining system S2, in accordance with a machining program. This numerical control device 1 in itself is an embodiment of a numerical control device according to the present disclosure.

The numerical control device 1 includes: a program analyzing unit 2 which analyzes a machining program and derives a condition of machining in the first machining system S1 and second machining system S2; a condition change unit 3 which changes a condition of machining of the first machining system S1 and second machining system S2 derived by the program analysis unit 2; a first machining control unit 4 which controls the first machining system S1 according to a condition derived by the program analysis unit 2 or a condition changed by the condition change unit; and a second machining control unit 5 which controls the second machining system S2 according to a condition derived by the program analysis unit 2 or condition changed by the condition change unit.

The numerical control device 1 can be realized by causing the appropriate control program to be executed in a computer device having a CPU, memory, etc. In addition, each constituent element of the numerical control device 1 are functionally distinguished, and may not necessarily be clearly distinguishable in the physical structure and program structure.

The program analysis unit 2 analyzes the machining program, and calculates the machining conditions deciding the target values at every time of the respective spindle Ac, feed axis Az and cut-in axis Ax of the first machining system S1 and second machining system S2. The machining conditions calculated by the program analysis unit 2 include a rotation speed of the spindle Ac, a base feedrate not including the oscillation component of the feed axis Az, a vibration and frequency of the oscillation component which periodically changes of the feed axis Az, a cut-in speed of the cut-in axis Ax, machining start time, etc.

The condition change unit 3, upon newly starting cutting by either of the first machining system S1 and second machining system S2, in a case of performing machining for which the presence/absence of tool oscillation differs from the newly starting machining by the other machining system, changes the conditions of newly starting machining, or machining for which the presence/absence of tool oscillation differs from the condition derived from the machining program. In other words, the condition change unit 3, in the case of one of the first machining system S1 and second machining system S2 performing oscillation cutting, and the other one performing non-oscillation cutting, suppresses a decline in machining precision of non-oscillation cutting caused by vibrations occurring from tool oscillation, by changing the conditions of either machining.

The condition change unit 3 can be made a configuration having a first change section 31 that changes the conditions of machining in a case of the newly started machining performing tool oscillation, and a second change section 32 that changes the conditions of machining in a case of the newly started machining not performing tool oscillation.

The first change section 31 can be made a configuration having a first queuing part 311 which delays the start of oscillation cutting accompanying newly started tool oscillation after finish of non-oscillation cutting which does not perform tool oscillation, i.e. changes machining start time; or a first oscillation adjustment part 312 which changes at least either of the vibration and frequency of tool oscillation so as to reduce the vibration by the tool oscillation of the oscillation cutting newly started.

It is preferable for the first queuing part 311, when the non-oscillation cutting performed in one machining system ends, to cause oscillation cutting to start in the other machining system right away. This is because there is no concern over adversely influencing non-oscillation cutting which is already being performed if not starting oscillation cutting, and thus a reason for make free time after the non-oscillation cutting ends does not exist.

The end of non-oscillation cutting may be determined according to a command signal inputted to the first machining system S1 from the first machining control unit 4 of the numerical control device 1 or a servo command signal inputted to the second machining system S2 from the second machining control unit 5; may be determined by a servo feedback signal to the numerical control device 1 from the first machining system S1 or second machining system S2; or may be determined based on the detection value of a sensor provided to each of the first machining system S1 and second machining system S2 and detecting the state of machining in the first machining system S1 and second machining system S2.

The first oscillation adjustment part 312 reduces the vibration of the machine tool 100 occurring from tool oscillation, by making smaller at least either of a ratio of the frequency of the tool oscillation relative to rotation number of the spindle Ac, and ratio of amplitude of the tool oscillation relative to feed amount of the tool T per one rotation of the spindle Ac. The first oscillation adjustment part 312 is configured so as to estimate the magnitude of vibration generated by tool oscillation, based on the amplitude and frequency of tool oscillation. The relationship between the amplitude and frequency of the tool oscillation and the magnitude of generated vibration can be defined experimentally as a correlation, due to a component depending on the configuration of the machine tool 100 being large. The first oscillation adjustment part 312, in the case of the assumed magnitude of vibration exceeding a predetermined threshold, re-estimates the generated magnitude of vibration, by making the ratio of frequency and ratio of amplitude of the tool oscillation a fixed amount smaller. The first oscillation adjustment part 312 decides the machining conditions which can reduce the magnitude of vibration generated by tool oscillation to no more than a predetermined threshold, and designates the machining conditions changed in the first machining control unit 4 controlling the machining system newly performing oscillation cutting, or the second machining system 2.

However, with oscillation cutting, since the tool T cannot cut chips if not configuring so that the trajectory drawn on the surface of the work piece W intersects at least one time in one rotation of the spindle Ac, there is a limit to the reduction in vibration by the first oscillation adjustment part 312. For this reason, the first change unit 31 confirms whether it is possible to sufficiently reduce vibration generated by the first oscillation adjustment part 312, and in a case of being able to sufficiently reduce the vibration generated by the first oscillation adjustment part 312, starts oscillation cutting with a condition decided by the first oscillation adjustment part 312 even if non-oscillation cutting is being performed in another machining system, and in the case of not being able to sufficiently reduce the generated vibration by the first oscillation adjustment part 312, may be configured so as to change the conditions so as to start oscillation cutting after non-oscillation cutting in another machining system ends by the first queuing part 311.

The second change unit 32 can be made a configuration having a second queuing part 321 which changes the machining start time of non-oscillation cutting newly started so as to delay the start of non-oscillation cutting to be newly started after the end of oscillation cutting performing tool oscillation; and a second oscillation adjustment part 322 which changes at least either of amplitude and frequency of the tool oscillation of the oscillation cutting already being performed so as to reduce the vibration generated by tool oscillation of the oscillation cutting already being performed.

The second queuing part 321, when oscillation cutting being performed in one machining system ends, preferably causes non-oscillation cutting to start in the other machining system after waiting for the vibration by the oscillation cutting to attenuate sufficiently.

The end of oscillation cutting may be determined by a command signal inputted to the first machining system S1 from the first machining control unit 4 of the numerical control device 1 or a servo command signal inputted to the second machining system S2 from the second machining control unit 2; may be determined by a servo feedback signal to the numerical control device 1 from the first machining system S1 or second machining system S2; or may be determined based on a detection value of a sensor provided to each of the first machining system S1 and second machining system S2 and detecting the state of machining in the first machining system S1 and second machining system S2.

In addition, attenuation of vibration by oscillation cutting may be determined as the vibration attenuating when a time calculated based on the conditions of oscillation current which has ended has elapsed; may be determined as the vibration attenuated when a fixed time set in advance has elapsed; or may be confirmed by the vibration sensor D. In the case of confirming the attenuation of vibration by the vibration sensor D, since the vibration does not attenuate unless oscillation cutting has ended, the attenuation of vibration may only be confirmed without the end of oscillation cutting being confirmed. In addition, attenuation of vibration may be determined according to the detection value of the vibration sensor D provided to the machining system that newly starts non-oscillation cutting; or in the case of the detection accuracy of the vibration sensor D being low, may be determined according to the detection value of the vibration sensor D provided to the machining system having performed the completed oscillation cutting. In the case of determining according to the detection value of the vibration sensor D provided to the machining system having performed the completed oscillation cutting, since the transmission of vibration can be asymmetrical depending on the configuration of the machine tool 100, the threshold of the detection value of the vibration sensor D of the second machining system S2 in the case of newly starting non-oscillation cutting by the first machining system S1, and a threshold of the detection value of the vibration sensor D of the first machining system S1 in the case of newly starting non-oscillation cutting in the second machining system S2 may be set to different values.

The second oscillation adjustment part 322 reduces the vibration of the machine tool 100 occurring by tool oscillation, by making smaller at least either of the ratio of frequency of the tool oscillation relative to the rotation number of the spindle Ac, and the ratio of amplitude of tool oscillation relative to the feed amount of the tool T per one rotation of the spindle Ac. The second oscillation adjustment part 322, similarly to the first oscillation adjustment part 312, estimates the magnitude of vibration generated every time changing the machining condition (frequency of tool oscillation and frequency), and decides the machining conditions which can reduce the magnitude of vibration generated by the tool oscillation to no more than a predetermined threshold, and then designates the machining conditions changed in the first machining control unit 4 controlling the machining system performing oscillation cutting which is already being performed, or in the second machining system S2.

The second change unit 32, similarly to the first change unit 31, also first confirms whether it is possible to sufficiently reduce vibration generated by the second oscillation adjustment unit 322, and in the case of being able to sufficiently reduce the generated vibration by the second oscillation adjustment part 322, changes the machining condition of the oscillation cutting already being performed to conditions decided by the second oscillation adjustment part 322, and in the case of not being able to sufficiently reduce the generated vibration by the second oscillation adjustment part 322, may be configured so as to change the conditions so as to start non-oscillation cutting after the oscillation cutting being performed in another machining system ends by the second queuing part 321.

The first machining control unit 4 stores the machining conditions derived from the machining program by the program analysis unit 2, and controls operation of the first machining system S1 in accordance with this machining condition. In addition, the machining conditions stored by the first machining control unit 4 are overwritable by the condition change unit 3.

The second machining control unit 5, similarly to the first machining control unit 4, stores the machining conditions derived from the machining program by the program analysis unit 2, and controls operation of the second machining system S2 in accordance with this machining condition. In addition, the machining conditions stored by the second machining control unit 5 are overwritable by the condition change unit 3.

Figure 2:
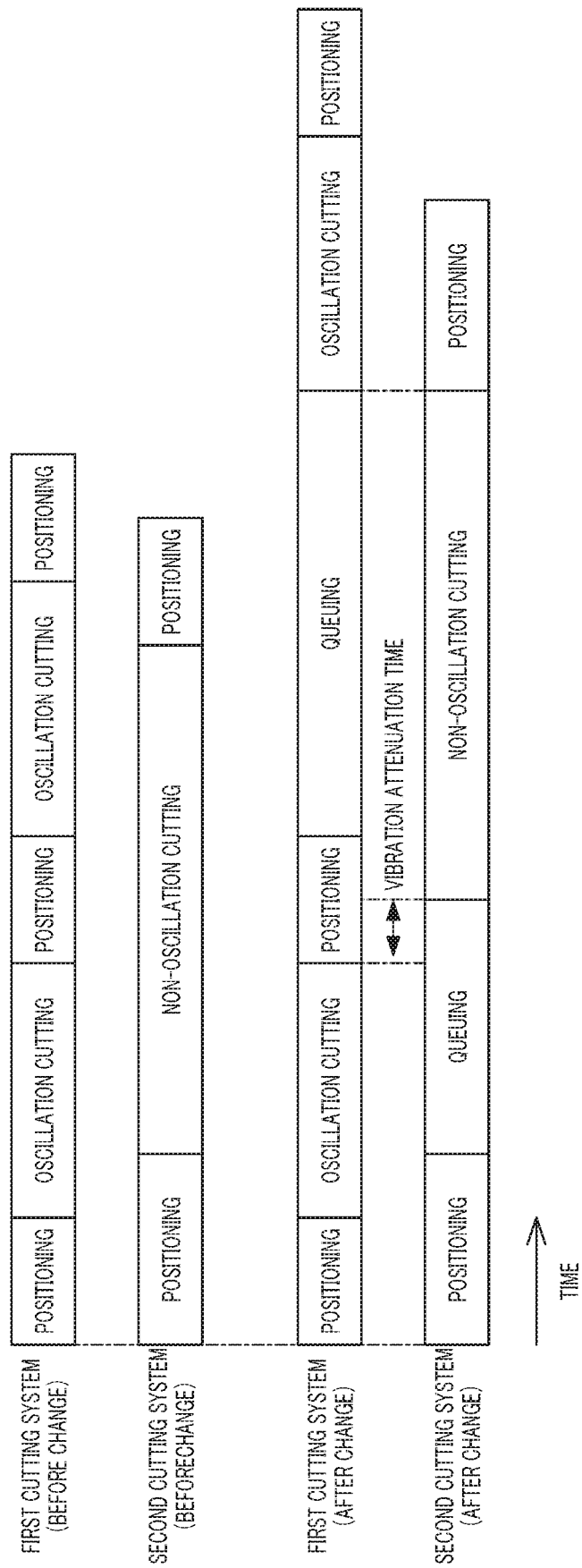
FIG. 2 is a time chart showing an example of machining in the machine tool of FIG. 1.

Next, advancing of the cutting in the first machining system S1 and second machining system S2 in the machine tool 100 will be explained. FIG. 2 is a time chart of cutting in the machine tool 100. The upper side in FIG. 2 shows an example of the timing of machining derived by the program analysis unit 2 from a machining program created without considering the influence of vibration by oscillation cutting, and the lower side in FIG. 2 shows the timing of machining after changing the upper level conditions by the condition change unit 3.

In this example, the first machining system S1 performs, in this order, a first machining start position, first oscillation cutting, positioning of the tool T to a second machining start position, second oscillation cutting, and third positioning to cause the tool T to return to the origin. On the other hand, the second machining system S2 performs, in this order, positioning of the tool T at a machining start position, non-oscillation cutting, and second positioning to cause the tool T to return to the origin.

With the conditions derived by the program analysis unit 2, the non-oscillation cutting is started by the second machining system S2 when oscillation cutting is being performed by the first machining system S1, and second oscillation cutting is started by the first machining system S1, when non-oscillation cutting is being performed by the second machining system S2. When performing machining of both machining systems S1, S2 with the conditions as is (timing), there is concern over the machining precision of non-oscillation cutting performed by the second machining system S2 declining due to vibrations occurring from the first and second oscillation cutting performed by the first machining system S1.

For this reason, the condition change unit 3 adds a queue for delaying the start of non-oscillation cutting by the second machining system S2 until the oscillation cutting of the first machining system S1 ends and vibration attenuates, and adds a queue for delaying the start of second oscillation cutting by the first machining system S1 until the non-oscillation cutting of the second machining system S2 ends. It is possible to appropriately prevent the vibration caused by oscillation cutting in the first machining system S1 from causing the precision of non-oscillation cutting in the second machining system S2 to decline.

In this way, since the numerical control device 1 introduces the appropriate queue time and changes the conditions of machining automatically by the condition change unit 3, it is possible for the operator to create a machining program without concerning the mutual influences between the cutting of the first machining system S1 and the cutting of the second machining system S2. In addition, in the case of the operator writing a queue command in a machining program, since calculating the appropriate queue time is complex, although there is a possibility of designating a longer time than necessary, it is possible to perform cutting in the minimum required time, while ensuring machining precision, by the condition change unit 3 introducing a queue time.

Although embodiments of a numerical control device and machine tool according to the present disclosure have been explained above, the numerical control device and machine tool according to the present disclosure are not to be limited to the aforementioned embodiments. In addition, the effects described in the present embodiment are merely listing the most preferred effects produced from the present disclosure, and the effects from the numerical control device and machine tool according to the present disclosure are not limited to those described in the present disclosure.

Figure 3:
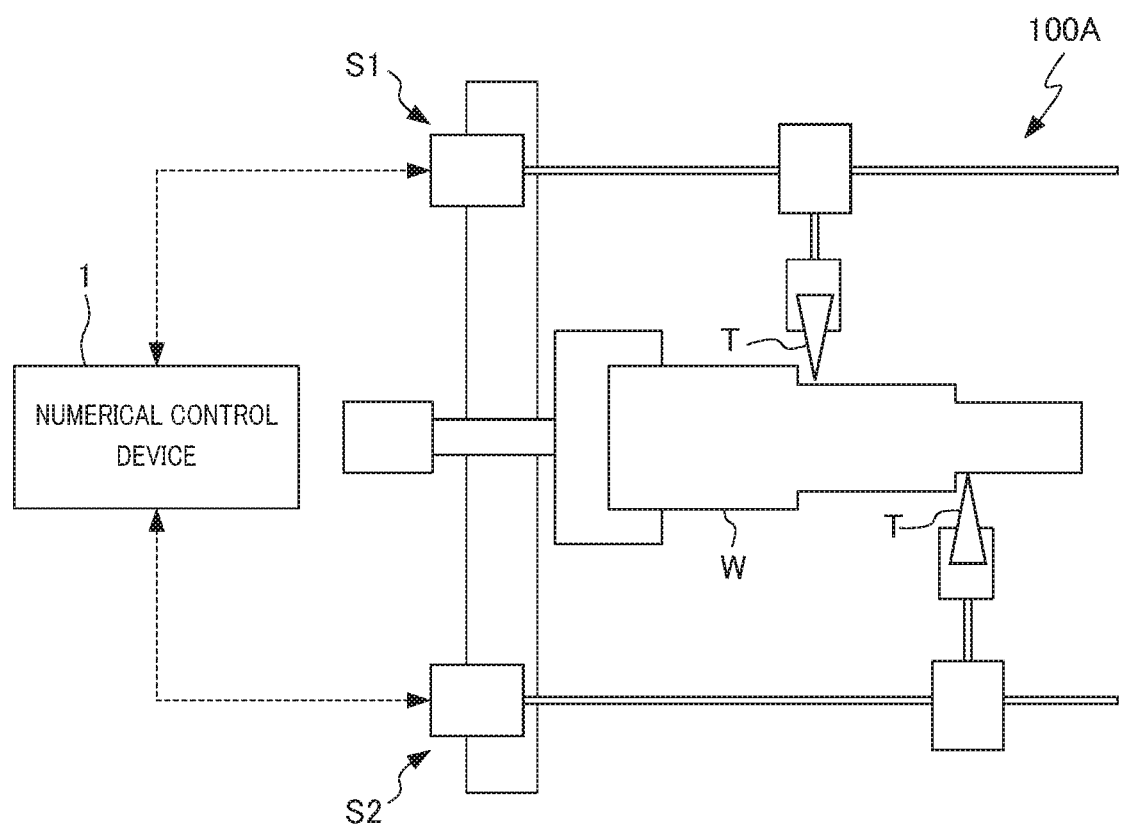
FIG. 3 is a schematic diagram showing the configuration of a machine tool according to another embodiment of the present disclosure.

The machine tool according to the present disclosure may be a configuration including a plurality of the machining systems S1, S2 which simultaneously cause a plurality of tools T to simultaneously act on a single workpiece W, and the numerical control device 1 which controls these machining systems S1, S2, as in the machine tool 100A exemplified in FIG. 3. In other words, the plurality of machining systems controlled by the numerical control device according to the present disclosure may be configurations which cause different tools to respectively act on a single workpiece.

Figure 4:
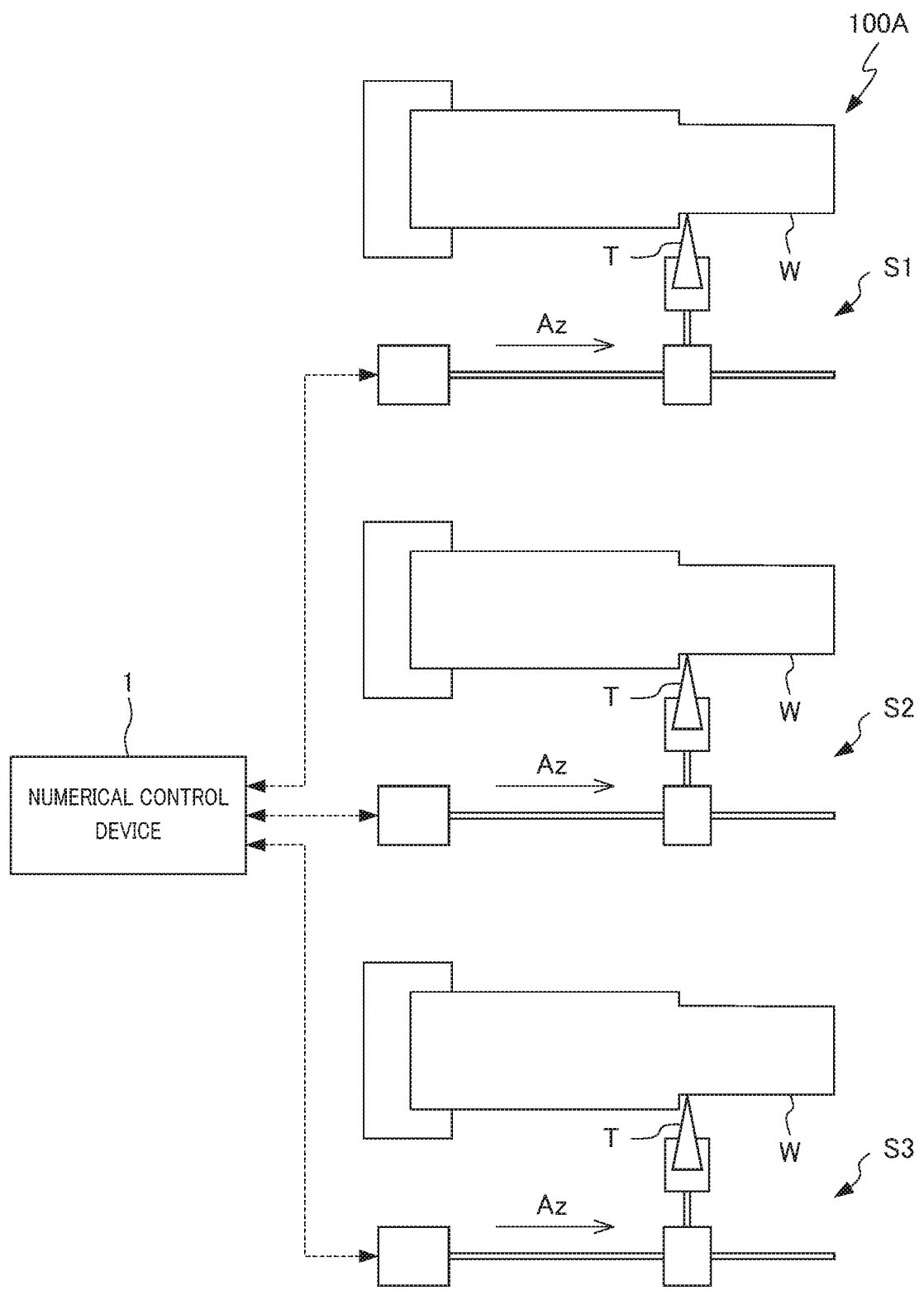
FIG. 4 is a schematic diagram showing the configuration of a machine tool according to yet another embodiment of the present disclosure.

The machine tool according to the present disclosure may include three or more machining systems, as in the machine tool 100B including the three machining systems S1, S2, S3 exemplified in FIG. 4. In this case, the condition change unit of the numerical control device according to the present disclosure may be configured so as to confirm only the state of a part of the machining system to which vibration in the vicinity of the machining system newly starting machining tends to be transmitted, and change the conditions of the machining system newly starting machining, or the machining system that performs machining for which the presence/absence of tool oscillation differs during confirmation having a different present of tool oscillation during confirmation.

The machine tool according to the present disclosure may be a multi-spindle machining center that performs cutting by causing a plurality of rotary tools to act on a workpiece, may be a multi-axis grinding device that allows a plurality of grinding tools or workpieces to periodically change speed, or may be a multi-axis electrical discharge machining device that causes the distance between a plurality of workpieces and electrodes (tools) to change. Therefore, the numerical control device according to the present disclosure can be applied to the control of such a variety of machine tools.

The condition change unit may have only one of the first change unit and second change unit. For example, in the case of not starting either of oscillation cutting and non-oscillation cutting later, the first change unit or second change unit is unnecessary.

The first change unit may have only either one of the first queuing part and first oscillation adjustment unit, and the second change unit may have only either one of the second queuing part and second oscillation adjustment unit.

The second change unit may start the non-oscillation cutting without waiting for attenuation of vibration by the tool oscillation. Depending on the device configuration, there are cases where the attenuation rate of vibration is large and it is not a problem even if starting non-oscillation cutting immediately after the end of oscillation cutting.

EXPLANATION OF REFERENCE NUMERALS

1 numerical control device
2 program analysis unit
3 condition change unit
4 first machining control unit
5 second machining control unit
31 first change unit
32 second change unit
100 machine tool
311 first queuing part
312 first oscillation adjustment part
321 second queuing part

322 second oscillation adjustment part
D vibration sensor
S1 first machining system
S2 second machining system
T tool
W workpiece

What is claimed is:

1. A numerical control device configured to control, in accordance with a machining program, a machine tool that includes a plurality of machining systems configured to perform machining by each causing a tool to act on a workpiece, and perform tool oscillation that causes a relative speed of the tool in relation to the workpiece to periodically change in at least one of the machining systems, the numerical control device comprising:

a condition change unit configured to, upon newly starting machining by one of the machining systems, in a case of another of the machining systems performing machining for which a presence/absence of the tool oscillation differs from the newly starting machining, change a first condition of the newly starting machining or the machining for which the presence/absence of the tool oscillation differs, from a second condition derived from the machining program.

2. The numerical control device according to claim 1, wherein the condition change unit includes a first change unit configured to, in a case of the newly starting machining performing the tool oscillation, change the first condition of the newly starting machining so as to delay start of the newly starting machining to after an end of machining which is not performing the tool oscillation, or reduce vibration by the tool oscillation of the newly starting machining.

3. The numerical control device according to claim 1, wherein the condition change unit includes a second change unit configured to, in a case of the newly starting machining not performing the tool oscillation, change the first condition of the newly starting machining so as to delay start of the newly staring machining to after an end of the machining performing the tool oscillation, or change the first condition of the machining performing the tool oscillation so as to reduce vibration by the tool oscillation of the machining performing the tool oscillation.

4. The numerical control device according to claim 3, wherein the second change unit is configured to change the first condition of the newly starting machining or the machining performing the tool oscillation, so that vibration by the tool oscillation further attenuates after the machining performing the tool oscillation ends, and then machining not performing the tool oscillation is started.

5. The numerical control device according to claim 1, wherein the condition change unit is configured to determine a state of machining being performed by a machining system other than the newly starting machining, based on a detection value of a sensor provided to each of the machining systems.

6. A machine tool comprising:

the numerical control device according to claim 1; and the plurality of machining systems that are to be controlled by the numerical control device and are configured to perform the machining by causing each respective tool to act on each respective workpiece.

* * * * *